(12) United States Patent
Veligdan

(10) Patent No.: US 6,921,452 B2
(45) Date of Patent: *Jul. 26, 2005

(54) LIGHT REDIRECTIVE DISPLAY PANEL AND A METHOD OF MAKING A LIGHT REDIRECTIVE DISPLAY PANEL

(75) Inventor: James T. Veligdan, Manorville, NY (US)

(73) Assignee: Brookhaven Science Associates, Upton, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/119,267

(22) Filed: Apr. 9, 2002

(65) Prior Publication Data

US 2002/0108693 A1 Aug. 15, 2002

Related U.S. Application Data

(60) Division of application No. 09/330,471, filed on Jun. 11, 1999, now Pat. No. 6,389,206, which is a continuation-in-part of application No. 09/116,613, filed on Jul. 16, 1998, now abandoned.

(51) Int. Cl.[7] .......................... B32B 31/18; B32B 31/20
(52) U.S. Cl. .......................... 156/253; 156/268; 65/386; 65/406; 65/430; 65/433; 427/163.2; 427/169; 427/434.2
(58) Field of Search .......................... 427/163.1, 163.2, 427/165, 169, 434.2, 434.4; 118/400–421, 423, 427–429; 156/250, 253, 257, 258, 267, 268; 65/386, 406, 430, 133; 445/24; 348/804, 197; 385/115–116, 119, 120, 901, 129, 50, 141, 121; 362/511, 31; 359/443, 449, 451, 454, 459

(56) References Cited

U.S. PATENT DOCUMENTS

| | | | |
|---|---|---|---|
| 4,729,631 A | * | 3/1988 | Takahashi et al. .......... 359/456 |
| 4,906,951 A | | 3/1990 | Moeller |
| 4,936,657 A | * | 6/1990 | Tejima et al. .................. 349/7 |
| 5,381,502 A | | 1/1995 | Veligdan |
| 5,521,725 A | * | 5/1996 | Beeson et al. ................ 349/95 |
| 5,914,760 A | | 6/1999 | Daiku |
| 6,222,971 B1 | * | 4/2001 | Veligdan et al. ............ 385/120 |
| 6,301,417 B1 | * | 10/2001 | Biscardi et al. ............. 385/120 |
| 6,400,876 B1 | * | 6/2002 | Biscardi et al. ............. 385/120 |
| 6,487,350 B1 | * | 11/2002 | Veligdan et al. ............ 385/120 |
| 6,519,400 B2 | * | 2/2003 | Biscardi et al. ............. 385/120 |
| 6,685,792 B2 | * | 2/2004 | Veligdan et al. ............ 156/256 |
| 6,741,779 B2 | * | 5/2004 | Veligdan ..................... 385/120 |
| 6,836,613 B2 | * | 12/2004 | DeSanto et al. ............. 156/104 |
| 6,856,753 B2 | * | 2/2005 | Biscardi et al. ............. 385/147 |
| 2002/0048438 A1 | * | 4/2002 | Veligdan ..................... 385/120 |
| 2003/0142936 A1 | * | 7/2003 | Biscardi et al. ............. 385/120 |
| 2004/0141712 A1 | * | 7/2004 | Biscardi ..................... 385/147 |

* cited by examiner

Primary Examiner—Jessica Rossi
(74) Attorney, Agent, or Firm—Reed Smith LLP; William J. McNichol, Jr.; Matthew J. Esserman

(57) ABSTRACT

An optical display panel which provides improved light intensity at a viewing angle by redirecting light emitting from the viewing screen, and a method of making a light redirective display panel, are disclosed. The panel includes an inlet face at one end for receiving light, and an outlet screen at an opposite end for displaying the light. The inlet face is defined at one end of a transparent body, which body may be formed by a plurality of waveguides, and the outlet screen is defined at an opposite end of the body. The screen includes light redirective elements at the outlet screen for re-directing light emitting from the outlet screen. The method includes stacking a plurality of glass sheets, with a layer of adhesive or epoxy between each sheet, curing the adhesive to form a stack, placing the stack against a saw and cutting the stack at two opposite ends to form a wedge-shaped panel having an inlet face and an outlet face, and forming at the outlet face a plurality of light redirective elements which direct light incident on the outlet face into a controlled light cone.

14 Claims, 3 Drawing Sheets

LIGHT REDIRECTIVE DISPLAY PANEL AND A METHOD OF MAKING A LIGHT REDIRECTIVE DISPLAY PANEL

CROSS REFERENCE TO RELATED APPLICATIONS

This is a division of U.S. application Ser. No. 09/330,471, filed Jun. 11, 1999, now U.S. Pat. No. 6,389,206, which is a continuation-in-part of U.S. application Ser. No. 09/116,613, filed Jul. 16, 1998, now abandoned.

STATEMENT REGARDING FEDERALLY SPONSORED RESEARCH OR DEVELOPMENT

This invention was made with Government support under contract number DE-AC02-98CH10886, awarded by the U.S. Department of Energy. The Government has certain rights in the invention.

BACKGROUND OF THE INVENTION

1. Field of the Invention

The present invention is directed generally to a planar optical display, and, more particularly, to a light redirective display panel and a method of making a light redirective display panel.

2. Description of the Background

A thin optical display panel having a plurality of laminated optical waveguides is disclosed in U.S. Pat. No. 5,381,502, herein incorporated by reference, over which the present invention is an improvement. It is known in the art that waveguides may be used to produce an optical panel having an inlet face and an outlet face, and waveguides in a panel may include a transparent core laminated between opposite cladding layers having a lower index of refraction.

A thin display panel formed in this manner may be used in various applications, such as a television video display screen. However, because the screen forms a small acute face angle with the longitudinal axes of the waveguides, the light transmitted by the waveguides has maximum intensity when viewed coaxially, and therefore displays reduced intensity in the normal viewing direction generally perpendicular to the screen. The prior art has attempted to overcome the lowered intensity of light at the screen by frosting the outlet ends of the waveguides defining the screen, thereby diffusing the displayed light. However, frosting of the screen may not adequately increase intensity, and does not resolve the underlying problem of obliquely directed light inherent in the thin panel.

Therefore, the need exists for a thin display panel having increased light intensity at its screen, which light is redirected perpendicular to the screen.

BRIEF SUMMARY OF THE INVENTION

The present invention is directed to an optical display panel which provides improved light intensity at a viewing angle by redirecting light emitting from the viewing screen. The light re-directive display panel includes an inlet face at one end for receiving light, and an outlet screen at an opposite end for displaying the light. The inlet face is defined at one end of a transparent body, which body may be formed by a plurality of waveguides, and the outlet screen is defined at an opposite end of the body and is disposed obliquely with the inlet face. The screen includes light re-directive elements at the outlet screen for re-directing light emitting from the outlet screen.

The present invention is also directed to a method of making a light redirective display panel. The method includes stacking a plurality of glass sheets, each having approximately equivalent light transmissive properties, with a layer of adhesive or epoxy between each sheet, curing the adhesive to form a stack, placing the stack against a saw and cutting the stack, using the saw, at two opposite ends at an angle to form a wedge-shaped panel having an inlet face and an outlet face, and forming at the outlet face a plurality of light redirective elements which direct light incident on the outlet face into a controlled light cone.

The present invention solves problems experienced in the prior art by displaying increased light intensity at the outlet screen through a redirection of light to a direction perpendicular to the outlet screen.

BRIEF DESCRIPTION OF THE SEVERAL VIEWS OF THE DRAWINGS

For the present invention to be clearly understood and readily practiced, the present invention will be described in conjunction with the following figures, wherein.

DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
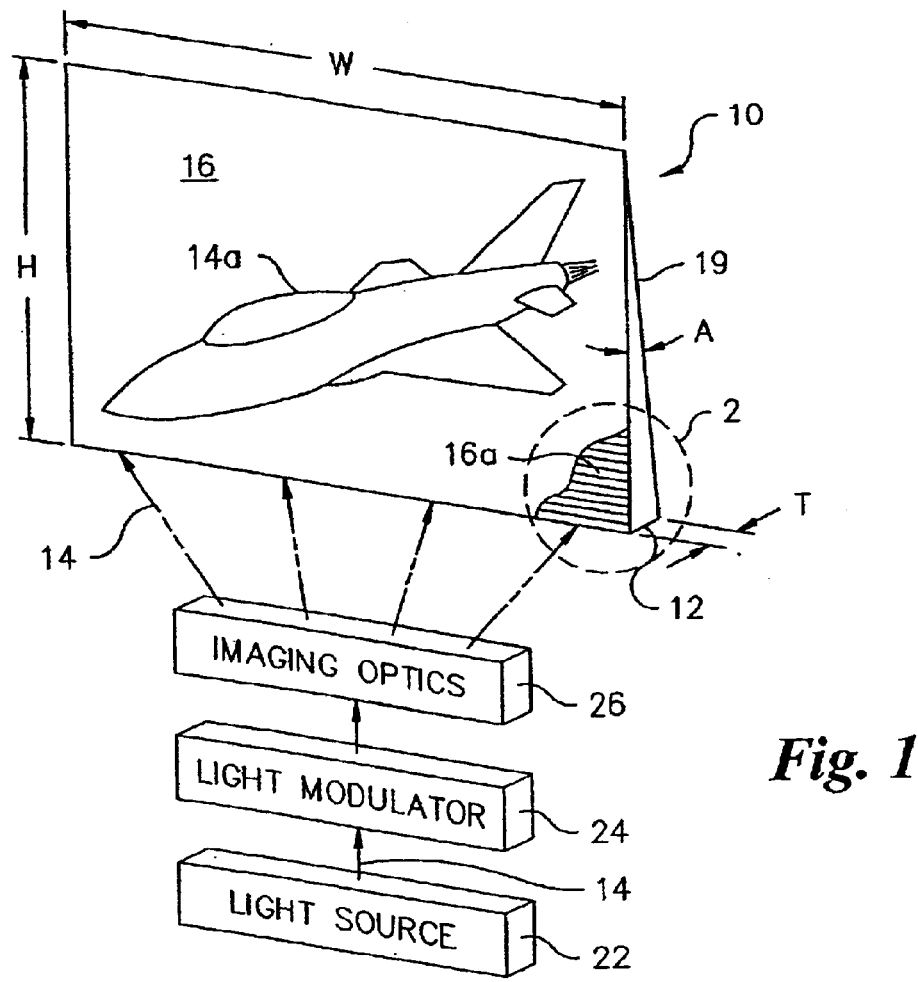
FIG. 1 is an isometric view schematic illustrating a display panel.

FIG. 1 is an isometric view schematic illustrating a display panel 10. The display panel 10 includes an inlet face 12 for receiving light 14, and an outlet face 16 disposed opposite the inlet face 12 for displaying light 14. The inlet face 12 and outlet face 16 may be formed by a plurality of waveguides 16a, wherein one end of each waveguide 16a forms an inlet for that waveguide, and wherein the opposite end of each waveguide 16a forms an outlet for that waveguide 16a. Each waveguide 16a extends horizontally, and the plurality of stacked waveguides 16a extends vertically. The light 14 may be displayed in a form such as, but not limited to, a video image 14a. The focusing length of the panel 10 may increase from the outlet face 16 to the back side 19 where the panel 10 is formed in a wedge shape, which may result in an image 14a having slightly reduced resolution. A panel 10 having reduced resolution may be used in alternate applications, rather than video display screen applications. For example, the panel 10 may be used as an illuminated button whose screen requires a simple image communicated to the viewer.

Figure 2:
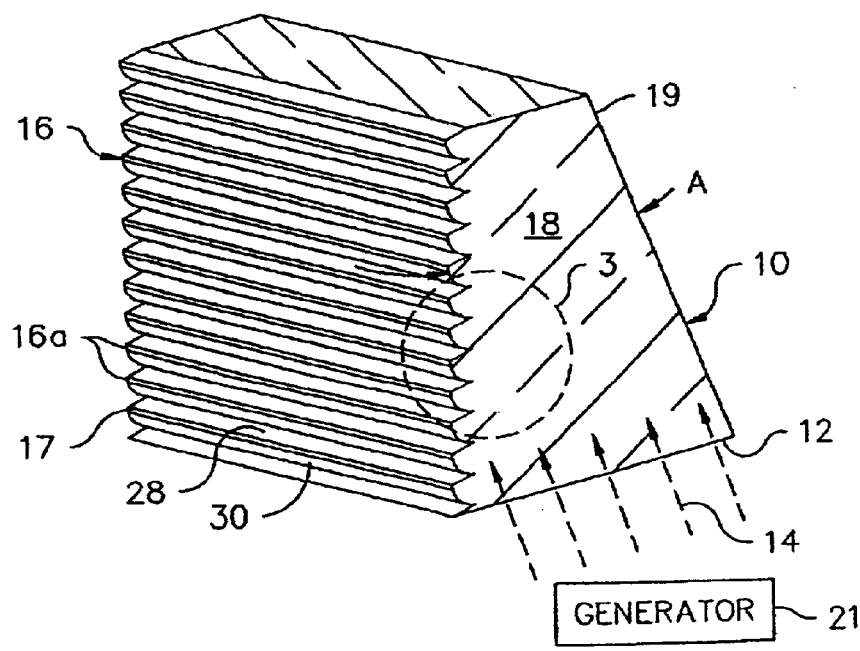
FIG. 2 is an isometric view schematic illustrating a horizontal and vertical cross-section of a light-redirective display panel.

FIG. 2 is an isometric view schematic illustrating a horizontal and vertical cross-section of a light-redirective display panel 10. The light redirective optical display panel 10 may include a plurality of stacked optical waveguides 16a, and includes an outlet face 16 at one end of a body 18 and an inlet face 12 at the opposed end of the body 18, a light generator 21, and at least one light redirective element 17 connected at the outlet face 16.

The body 18 is preferably solid, and may be homogeneous, and receives light 14 along the surface of the inlet face 12. The light 14 is passed through the body 18 after entering the inlet face 12. In a preferred embodiment of the present invention, the body 18 is formed of the length, height, and width of the plurality of stacked waveguides 16a.

The plurality of stacked waveguides 16a may, in a preferred embodiment of the present invention, form the body 18 of the panel 10, and may form at one end of the stack 16a the inlet face 12, and at an opposed end the outlet face 16. The waveguides 16a may be formed of any material known in the art to be suitable for passing electromagnetic waves therethrough, such as, but not limited to, plastics, plexiglass, or glass. The preferred embodiment of the present invention is implemented using individual glass sheets, which are typically approximately 0.004" thick, and which may be of a manageable length and width. The plurality of stacked waveguides 16a may be formed by first laying a first glass sheet in a trough sized slightly larger than the first glass sheet. The trough may then be filled with a thermally curing epoxy. The epoxy is preferably black; in order to form a black layer between waveguides, thereby providing improved viewing contrast; The term black is used herein to encompass not only pure black color, but additionally any functionally comparable dark color suitable for use in the present invention, such as dark blue. Furthermore, the epoxy should possess the properties of a suitable cladding layer, such as having a lower index of refraction than the glass sheets to allow substantially total internal reflection of the light 14 within the glass sheet. After filling of the trough, glass sheets are repeatedly stacked, and a layer of epoxy forms between each glass sheet. The sheets are preferably stacked at a slight angle, but the angle must be less than 90 degrees. The stacking is preferably repeated until between approximately 600–800 sheets have been stacked. Uniform pressure may then be applied to the stack, thereby causing the epoxy to flow to a generally uniform level between glass sheets. In a preferred embodiment of the present invention, the uniform level obtained is approximately 0.0002" between glass sheets. The stack may then be baked to cure at 80 degrees Celsius for such time as is necessary to cure the epoxy, and the stack is then allowed to cool slowly in order to prevent cracking of the glass. After curing, the stack may be placed against a saw, such as, but not limited to, a diamond saw, and cut at two opposite ends at an angle to form a wedge-shaped panel 10 having an inlet face 12 and an outlet face 16. The cut portions of the panel 10 may then be polished with a diamond polisher to remove any saw marks. In an alternative embodiment of the present invention, the glass sheets preferably have a width in the range between 0.5" and 1.0", and are of a manageable length, such o as 12". The sheets are stacked, but need not be stacked at an angle, with a layer of black UV adhesive being placed between each sheet. Ultraviolet radiation is then used to cure each adhesive layer, and the stack may then be cut and/or polished.

The outlet face 16 may be formed by the plurality of stacked optical waveguides 16a. The outlet face 16 is at one end of the body 18, and is disposed obliquely with the inlet face 12. The inlet face 12 is generally defined as the bottom of the body 18, and the outlet face 16 is defined as the front of the body 18. The outlet face 16 may be generally perpendicular to the inlet face 12, forming a triangular wedge having an acute face angle A between the inlet face 16 of the body 18 and the back end 19 of the body 18. The acute face angle A may be in the range of about 1 to 10 degrees, and is preferably about 5 degrees, with the light redirective display panel 10 increasing in thickness from a minimum at the top of the body 18, to a maximum thickness at the bottom of the body 18. The maximum thickness may be chosen as small as is practicable in a given application. The light redirective display panel 10 has a height from the top to the bottom of the outlet face 16, and a width from the left to the right of the outlet face 16. The width and height may be selected to produce width to height aspect ratios of 4:3 or 16:9, for example, for use in a typical television application. In an exemplary embodiment of the present invention, a maximum thickness in the range of about 8.0 to 10.0 cm may be chosen, in conjunction with a height of 100 cm and a width of 133 cm.

The light generator 21 generates light 14 and passes the light to inlet face 12. The light generator may include a light source 22, a light modulator 24, and imaging optics 26, as shown in FIG. 1. The light 14 may be initially generated by the light source 22. The light source 22 may be, for example, a bright incandescent bulb, a laser, an LED, or an arc lamp. The light 14 from the source 22 may then be modulated by the modulator 24 for defining individual picture elements, known in the art as pixels. The modulator 24 may take a form known in the art, such as, but not limited to, a liquid crystal display (LCD), a Digital Micromirror Device (DMD), a raster scanner, a vector scanner, an FED, or a CRT. The imaging optics 26 may include light folding mirrors or lenses. The imaging optics 26 are optically aligned between the inlet face 12 and the light modulator 24 for compressing or expanding and focusing the light 14 as required to fit the inlet face 12. The light 14, after entry into the inlet face 12, travels through the panel body 18 to the outlet face 16. The light 14 is projected from the image optics 26 over the inlet face 12, and is thus directed generally vertically upward for projection from the outlet face 16.

The at least one light redirective element 17 is connected at the outlet face 16 in order to redirect the light 14, which is incident in a direction generally vertically upward from the inlet face 12, to a direction perpendicular to the outlet face 16. The light redirective element 17 may be, but is not limited to, a serration, a plurality of serrations, a holographic coating, a lens or series of lenses, a micro-lens or series of micro-lenses, or a Fresnel prism. The light redirective element 17 may be connected to the outlet face 16 by a suitable manner known in the art, where the suitability is subject to the type of light redirective element used in a given application. Some suitable connections may be, for example, epoxy, glue, or transparent double-sided tape. In an alternate embodiment of the present invention, the light redirective element 17 may be formed as a portion of the inlet face 16, as discussed below.

Figure 3:
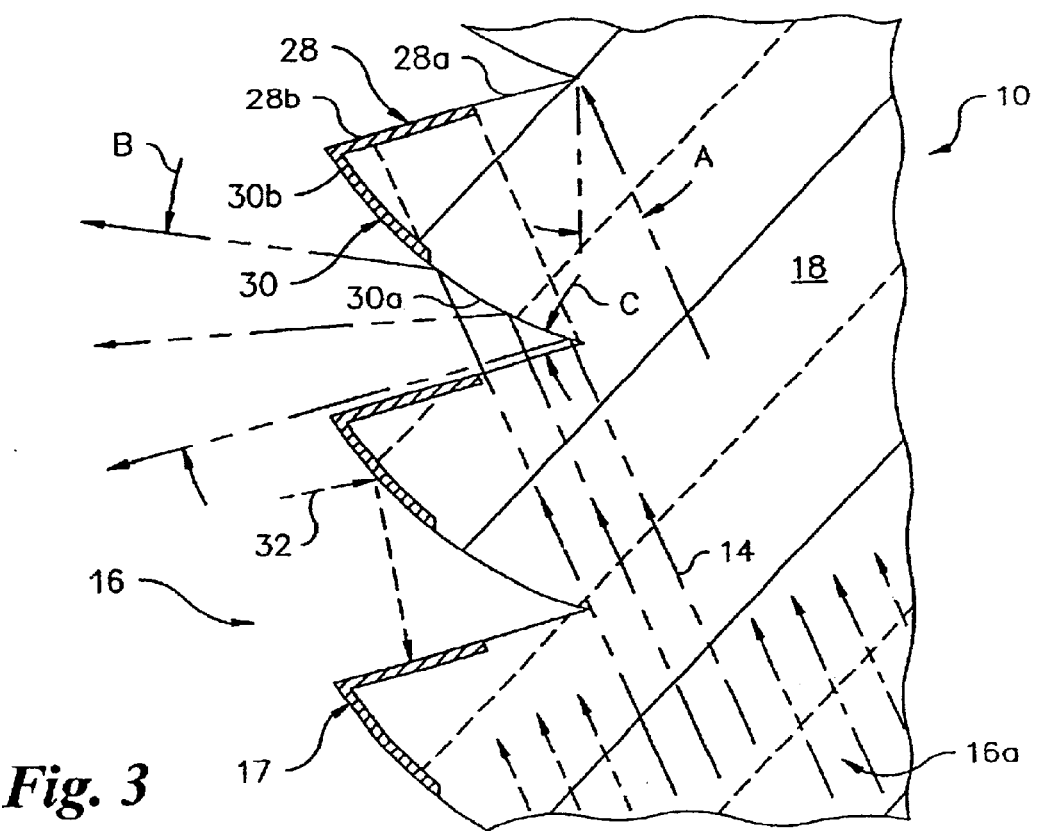
FIG. 3 is a side view schematic illustrating a vertical cross-section of an exemplary embodiment of the light redirective display panel of FIG.2, wherein the light redirective elements are a plurality of vertically adjoining serrations.

FIG. 3 is a side view schematic illustrating a vertical cross-section of an exemplary embodiment of the light redirective display panel 10 of FIG. 2, wherein the light redirective elements 17 are a plurality of vertically adjoining serrations 17. The serrations 17 are specifically configured to redirect the light 14 incident in a direction generally upward in the panel body 18 to a direction generally perpendicular to the outlet face 16, thereby increasing light intensity at the outlet face 16.

The serrations 17 may be, but are not limited to, a generally triangular or tooth-like vertical cross-section. In one embodiment of the present invention, the serrations 17 are cut at the end of the plurality of waveguides 16a at the outlet face 16. The cutting is performed using a milling machine. The milling machine may be similar to a dovetail cutter, but may have a curved cutting-surface rather that a straight one. A plastic POD is secured in the milling machine and the milling machine is then programmed, using methods known in the art, to cut a plurality of serration grooves which will coincide with the outlet face 16. In one embodiment of the present invention, the serration grooves display a coincidence of at least one serration 17 to each waveguide 16a. A coincidence of more than one serration 17 per waveguide 16a allows the angular alignment of serration 17 with respect to the waveguide 16a to become non-critical. In an alternative embodiment of the present invention, a single master serration grid is formed to coincide with a standard outlet face 16, which master grid is then replicated from the master grid mold. Each replicated grid, having thereon a plurality of serrations 17, is then fastened to an outlet face 16. The serrations 17 preferably extend along the entire outlet face 16 width and are spaced apart at predetermined intervals vertically along the outlet face height for receiving and redirecting respective portions of the light 14 from the inlet face 12. The serrations 17 may be straight and continuous in the horizontal direction across the width of the outlet face 16.

The serrations 17 may each include a transparent first facet 28, which first facet may be optically aligned with the body 18 for transmitting or emitting the light 14 therefrom, and a mirrored second facet 30 for reflecting the light from an opposing first facet of an adjoining one of the serrations 17. In one embodiment of the present invention, the mirror of second facet 30 is formed by attaching foil to the groove forming each second facet 30, where the foil used has an adhesive backing. The foil may be placed by hand, or by any method known in the art. In a second embodiment of the present invention, the mirror is formed by methods known in the art for coating plastic with highly reflective materials, such as chrome and silver. Each of the second facets 30 is inclined substantially vertically upwardly outward from the outlet face height, and is aligned generally obliquely with a cooperating first facet 28 of an adjoining serration 17. The upwardly traveling light 14 is thereby emitted from each of the first facets 28 and is reflected obliquely from the next adjoining second facet 30 immediately thereabove. The reflective nature of the second facet 30 necessarily blocks transmission of light 14 to the first facet 28 of the same serration 17 The transparent nature of the first facet 28 allows the light 14 to leave the body 18 and be reflected from the portion of the second facet 30 correspondingly disposed thereabove.

The portion of the light 14 reflected by each of the second facets 30 forms a vertical viewing cone which diverges outwardly away from the screen with a cone angle which is controlled by the specific contour and angle of the second facets 30. The angular orientation of the second facet 30 of the serration 17 is coordinated with the transmission axes of the light 14 inside the body 18. In an embodiment wherein the serrations 17 are milled as discussed above, the serration fixture is rigged before milling to insure proper alignment of the serrations 17 with the outlet face 16 and transmission axes of the light 14. Where multiple serrations 17 are present for each of a plurality of waveguides 16a, angular alignment of individual serrations 17 is non-critical. Where one serration 17 is present for each of a plurality of waveguides 16a, angular alignment is critical to avoid blockage of the transmission of the light 14 along the transmission axis. The light 14 nominally intersects the outlet face 16 at the face angle A, and therefore the second facet 30 is preferably vertically inclined from the outlet face 16 to allow reflection of the light 14 perpendicularly outward from the outlet face 16. Correspondingly, the first facet 28 diverges away from the adjacent second facet 30 at spread angle C, thereby allowing unobstructed reflection of the light 14 from the second facet 30. The vertical contour of the second facet 30 may be selected in conjunction with the spread angle C to produce the desired vertical viewing cone B. The angle C is a matter of design choice as a function of B, and the angle C may be varied by control over the milling process as discussed above. Therefore, in a preferred embodiment of the present invention, the second facets 30 are vertically arcuate, such as convex or concave, thus allowing for a more equal vertical distribution of the reflected light therefrom. In alternate embodiments of the present invention, the second facet 30 may be flat in shape, although such a shape thereby reduces the vertical viewing cone. The proper angle and shape of the second 30 can be calculated to direct light 14 to the viewer, once the likely alignment of the viewer is known with respect to light path 14. The light cone directed to the viewer can then be controlled with great accuracy, providing control even to an extreme in which, if a viewer moves in any manner, the viewer will receive no light 14. The first facets 28 directly emit the light 14 incident from the body 18, and therefore the first facets 28 may have any contour of suitable design choice in a given application, such as, but not limited to, a flat and straight contour.

The first facet 28 includes an inboard portion 28a and an outboard portion 28b. The outboard portion 28b of the first facet 28 is preferably black in color for absorbing ambient light 32. The black color may be provided by applying black paint on the outboard portion 28b, or by applying black paint to the outboard portion 28b and the entire second facet 30 before attaching the mirror to the second facet 30, or the outboard portion 28b may be integrally molded with carbon black therein. The outboard portions 28b of the first facets 28 may be viewable by a viewer, and consequently the presence of black therein increases the viewing contrast from the outlet face 16.

The second facet 30 also includes an inboard 30a and an outboard portion 30b. The second facet 30 is preferably aligned with the inlet face 12 to block line-of-sight transmission of the light 14 to the outboard portion 28b of the corresponding first facet 28 of the same serration 17, while allowing transmission of the light 14 to the adjacent inboard portion 28a. Accordingly, the inboard portion 30a of the second facet 30 is optically aligned with the inboard portion 28a of the first facet 28 of the adjoining serration 17. The outboard portion 30b of the second facet 30 may be black, thereby further increasing the black surface area of the outlet face 16, and correspondingly increasing the viewing contrast. The black color may be provided by applying back paint on the outboard portion 30b, or by applying black paint to the entire second facet 30 before attaching the mirror to the second facet 30, or the outboard portion 30b may be integrally molded with carbon black therein. In an alternative embodiment of the present invention, the outboard portion 30b could also be reflective, although such an embodiment might display degraded viewing contrast. The outboard portion 30b of the second facet 30 may be optically aligned with the corresponding outboard portion 28b of the first facet 28 of the adjoining serration 17 to use to advantage the black contrast thereof.

Figure 4:
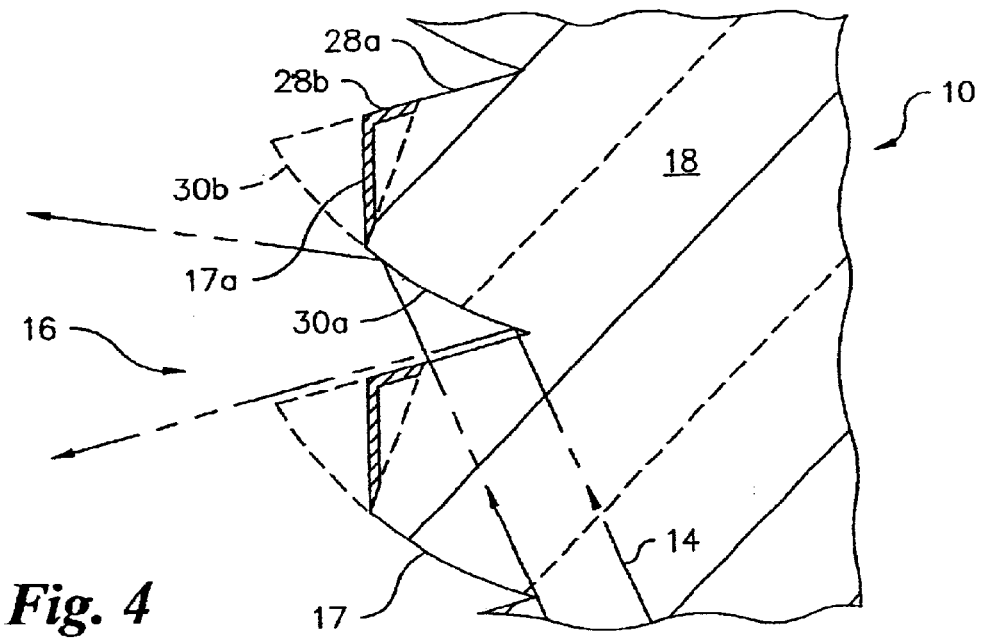
FIG. 4 is a side view schematic illustrating a vertical cross-section of an alternative embodiment of the light redirective display panel of FIG. 3.

FIG. 4 is a side view schematic illustrating a vertical cross-section of an alternative embodiment of the light redirective display panel 10 of FIG. 3, wherein the serrations 17 may be truncated in part or in total to remove the outboard portions 28b, 30b, while retaining at least the inboard portions 28a, 30a of both the first and the second facet 28, 30. In this alternative embodiment, a portion of the outboard portion 28b of the first facet 28 may remain from FIG. 2, and the entire outboard portion 30b of the second facet 30 may be eliminated, o thereby forming a vertical forward face 17a for each serration, which vertical forward face 17a is aligned in parallel with the outlet face 16. The outboard portion 28b of the first facet 28 and the vertical forward face 17a are preferably black for providing viewing contrast. This truncation may be performed to smooth the sharp edges of the serrations 17, thereby improving the durability of the light redirective display panel 10, as well as increasing the ease of manufacture.

Figure 5:
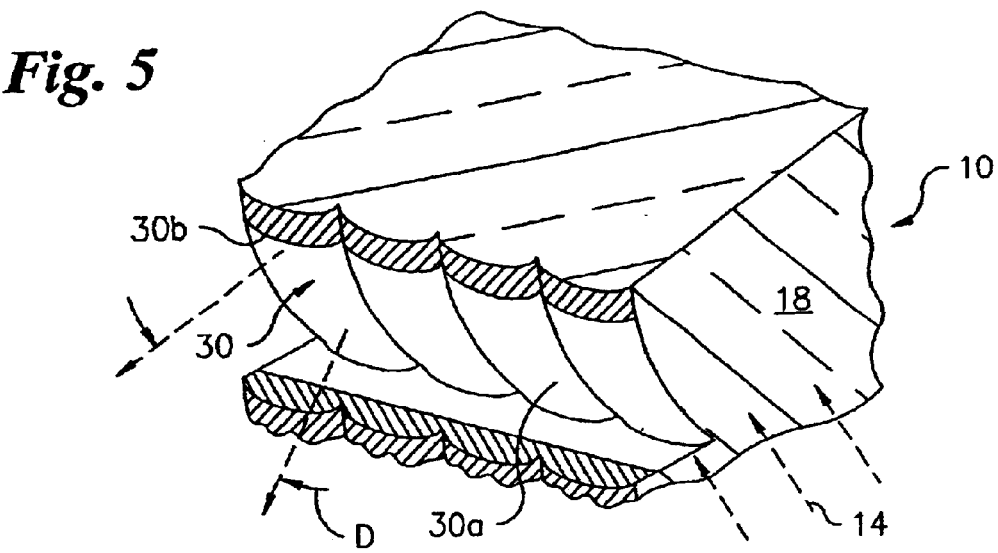
FIG. 5 is an isometric view schematic illustrating a horizontal cross-section of an alternative embodiment of the light redirective display panel.

FIG. 5 is an isometric view schematic illustrating a horizontal cross-section of an alternative embodiment of the light redirective display panel 10, wherein the second facet 30 may be suitably granular, roughed, concave, or convex to disperse light 14 horizontally in a corresponding spread angle D, in addition to dispersing the light with the vertical cone angle B as was illustrated with respect to FIG. 3. The second facet 30 may be double arcuate, such as convex in both the vertical direction along the height of the screen as well as in the horizontal direction along the width of the screen. Alternatively, the second facet 30 may be double concave. The second facet 30 may be scalloped into a series of horizontally repeating convex or concave portions for horizontally dispersing the light. The first facet 28 may be straight and configured as illustrated with respect to FIG. 3, but the first facet 28 may then be correspondingly scalloped at the outboard end to match the scalloping of the second facets 30.

Figure 6:
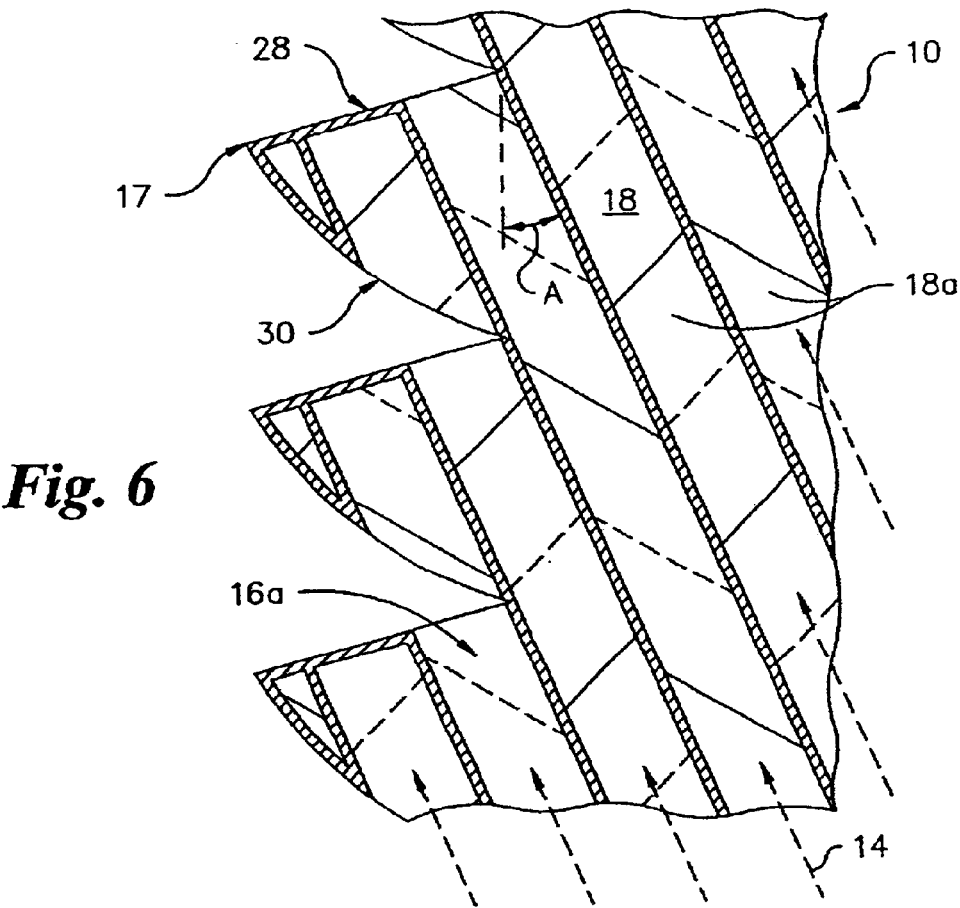
FIG. 6 is a side view schematic illustrating a vertical cross-section of the embodiment of the light redirective display panel wherein the serrations are incorporated into an optical waveguide panel.

FIG. 6 is a side view schematic illustrating a vertical cross-section of the embodiment of the light redirective display panel 10 wherein the serrations 17 are incorporated into an optical waveguide panel of the type disclosed in U.S. Pat. No. 5,381,502, incorporated hereinabove by reference. In this embodiment, the body 18 includes a plurality of stacked optical ribbon waveguides 16a, extending from the inlet face 12 to the outlet face 16, for independently channeling and confining the light 14 therethrough. Each waveguide 16a extends the full width of the panel 10. Each waveguide 16a has a central transparent core laminated between suitable cladding layers having a lower index of refraction for obtaining substantially total internal reflection of the light 14 in the individual cores. The serrations 17 may take any suitable form, such as the triangular serrations 17 illustrated in FIG. 2 and FIG. 3, for example. Each of the waveguides 16a is optically aligned with at least one of the serrations 17 for providing enhanced resolution in the vertical direction.

Those of ordinary skill in the art will recognize that many modifications and variations of the present invention may be implemented. The foregoing description and the following claims are intended to cover all such modifications and variations.

What is claimed is:

1. A method of producing a stacked waveguide optical panel having a controlled light cone emitting therefrom, comprising:

laying a first sheet in a trough sized slightly larger than the first sheet;

filling the trough with a thermally curing epoxy;

stacking a plurality of sheets, each having light transmissive properties approximately equivalent to the first sheet, atop the first sheet in the trough, thereby forming a layer of epoxy between each sheet;

applying uniform pressure to the stack formed by said stacking, thereby causing the epoxy to flow to a generally uniform level between two adjacent sheets;

baking the stack to cure;

cooling the stack slowly to prevent cracking of the sheets;

placing the stack against a saw and cutting the stack, using the saw, at two opposite ends at an angle to form a wedge-shaped panel having an inlet face and an outlet face; and forming at the outlet face a plurality of light redirective elements which direct light incident on the outlet face into a controlled light cone.

2. The method of claim 1, wherein the epoxy is black in color.

3. The method of claim 1, wherein the epoxy has a lower index of refraction than the first sheet.

4. The method of claim 1, wherein said stacking is at an angle of less than 90 degrees.

5. The method of claim 1, wherein said stacking is repeated until between about 600 and about 800 sheets are stacked.

6. The method of claim 1, wherein the generally uniform level is about 0.0002".

7. The method of claim 1, wherein the saw is a diamond saw.

8. The method of claim 1, wherein the baking occurs at about 80 degrees Celsius.

9. The method of claim 1, further comprising polishing the cut stack to remove any saw marks.

10. The method of claim 9, wherein said polishing is performed using a diamond polisher.

11. The method of claim 1, wherein the light redirective elements are serrations.

12. The method of claim 11, wherein said forming of a plurality of serrations includes:

Securing a plastic POD in a milling machine; and programming the milling machine to cut a plurality of serration grooves which will coincide with the waveguides of the outlet face.

13. The method of claim 12, wherein said programming is performed to allow the serration grooves to display a coincidence of at least one serration to each waveguide.

14. A method of producing a stacked waveguide optical panel having a controlled light cone emitting therefrom, comprising:

laying a first sheet in a trough sized slightly larger than the first sheet;

filling the trough with a thermally curing epoxy;

stacking a plurality of sheets, each having light transmissive properties approximately equivalent to the first sheet, atop the first sheet in the trough, thereby forming a layer of epoxy between each sheet;

applying uniform pressure to the stack formed by said stacking, thereby causing the epoxy to flow to a generally uniform level between two adjacent sheets;

baking the stack to cure;

cooling the stack slowly to prevent cracking of the sheets;

placing the stack against a saw and cutting the stack, using the saw, at two opposite ends at an angle to form a wedge-shaped panel having an inlet face and an outlet face; and providing in the vicinity of the outlet face a plurality of light redirective elements which direct light incident on the outlet face into a controlled light cone, wherein the light redirective elements are serrations;

wherein said providing of said plurality of serrations includes:

forming a single master serration grid to coincide with a standard outlet face;

replicating a new serration grid from the single master serration grid; and fastening the new serration grid, having thereon a plurality of serrations, to the outlet face.

\* \* \* \* \*